(12) United States Patent
Jones et al.

(10) Patent No.: US 7,597,931 B2
(45) Date of Patent: Oct. 6, 2009

(54) DEVICE AND METHOD FOR PRODUCING A FOAM MATERIAL

(75) Inventors: Frank Jones, Mettmann (DE); Marcel Puffe, Sankt Augustin (DE)

(73) Assignee: Nordson Corporation, Westlake, OH (US)

( * ) Notice: Subject to any disclaimer, the term of this patent is extended or adjusted under 35 U.S.C. 154(b) by 275 days.

(21) Appl. No.: 11/470,081

(22) Filed: Sep. 5, 2006

(65) Prior Publication Data

US 2007/0051832 A1 Mar. 8, 2007

(30) Foreign Application Priority Data

Sep. 6, 2005 (DE) .................. 10 2005 042 380

(51) Int. Cl.
*B05D 5/00* (2006.01)
(52) U.S. Cl. ........................................ 427/244
(58) Field of Classification Search ............ 427/244; 169/14; 222/190
See application file for complete search history.

(56) References Cited

U.S. PATENT DOCUMENTS

| | | | |
|---|---|---|---|
| 4,059,466 A | 11/1977 | Scholl et al. | |
| 4,059,714 A | 11/1977 | Scholl et al. | |
| 4,200,207 A | 4/1980 | Akers et al. | |
| 4,396,529 A | 8/1983 | Price et al. | |
| 4,405,063 A | 9/1983 | Wydro et al. | |
| 4,505,406 A * | 3/1985 | Cobbs et al. | 222/135 |
| 4,676,926 A * | 6/1987 | Kappler | 516/10 |
| 4,679,710 A | 7/1987 | Jameson et al. | |
| 4,779,762 A | 10/1988 | Klein et al. | |
| 4,791,142 A | 12/1988 | Pleuse et al. | |
| 4,983,424 A | 1/1991 | Saidman et al. | |
| 5,056,034 A | 10/1991 | Rucki et al. | |
| 5,157,894 A | 10/1992 | Mini et al. | |
| 5,318,207 A | 6/1994 | Porter et al. | |
| 5,382,397 A | 1/1995 | Turner, Jr. | |
| 5,429,840 A | 7/1995 | Raterman et al. | |
| 5,480,589 A | 1/1996 | Belser et al. | |
| 5,524,828 A | 6/1996 | Raterman et al. | |
| 5,556,471 A | 9/1996 | Boccagno et al. | |
| 5,938,079 A | 8/1999 | Wacker et al. | |
| 2005/0094482 A1 | 5/2005 | Foster, Jr. et al. | |

FOREIGN PATENT DOCUMENTS

| | | |
|---|---|---|
| EP | 0220450 B1 | 3/1989 |
| EP | 0428873 B1 | 4/1996 |
| EP | 0651677 B1 | 10/1997 |

* cited by examiner

*Primary Examiner*—Roberts Culbert
(74) *Attorney, Agent, or Firm*—Wood, Herron & Evans, L.L.P.

(57) ABSTRACT

A device for producing a foam material, comprising a gas supply line which is connectable at a first end to a gas source, a material supply line which is connectable at a first end to a material supply source, a material transporting device which is connected to a second end of the material supply line, and a mixing device into which material and gas may be introduced and in which they may be mixed together, and from which a homogeneous mixed foam is deliverable from an output orifice.

18 Claims, 1 Drawing Sheet

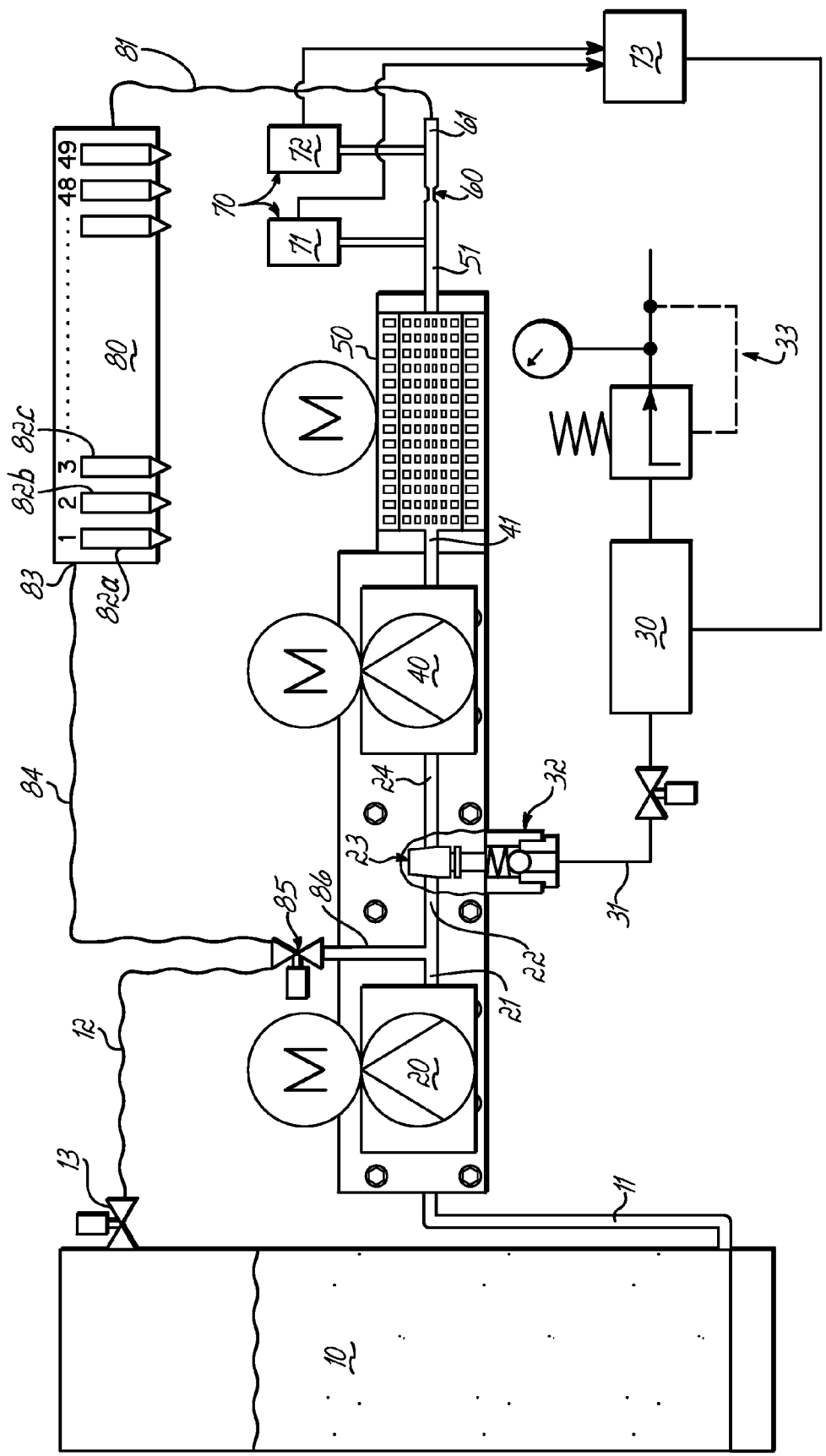

DEVICE AND METHOD FOR PRODUCING A FOAM MATERIAL

The present applications claims the priority of German Patent Application No. 10 2005 042 380.9 under 35 U.S.C. §119. The disclosure of that priority application is hereby fully incorporated by reference herein.

TECHNICAL FIELD

The invention generally relates to devices and methods for producing a foam material, such as foamed sealants, adhesives and other products.

BACKGROUND

A device and a method of the forenamed general type are known from EP 0 428 873 B1. Devices and methods of this type are used to make, using a liquid material, for example a molten material, and a gas, for example air, a foam in which the material and the gas are mixed intensively with each other. Foams made in this way are needed for a great many applications, including adhesive foams, foam sealants, foam packaging material or the like.

These devices and methods can produce homogeneous foams, i.e., foams having a pore size that falls within a predetermined range and which maintain this pore size range in all areas of the foam. Often an effort is made to achieve as small a pore size as possible and to have the maximum possible number of pores present per unit of foam volume. EP 0 428 873 B1 proposes a system for this purpose in which the flow-through of the liquid material is measured with a liquid flow metering device and the flow-through of gas is measured by means of a gas flow measuring device. Two signals based on these measurements are compared to each other, and target data are used to determine a target gas content which is determined by calculating and setting a differential gas value. While this system is able to achieve a satisfactory foam quality for a number of types of foam, the system has a complex control technique which also results in little system variability.

From EP 0 651 677 B1 a device and a method for applying foam coatings are known in which an effort is made to increase the foam quality by supplying heated air to the foam laterally from both sides in an applicator head and thereby achieving additional mixing. With this additional supply of air it is possible to better control the beginning and ending of application, and the quality of the foam itself is also improved. However, the device and method from EP 0 651 677 B1 have the disadvantage that a relatively complex design of the foam applicator head is necessary, and in addition the variability of the device is limited with regard to different types and compositions of foam.

Finally, from EP 0 220 450 B1 a method and a device for foaming high-viscosity polymer materials are known, in which a liquid and a gas are mixed together in a mixing device that includes two rotating shafts with mixing elements formed on them. While this mixing device is able to achieve a homogeneous foam, it has the disadvantage that in particular the beginning and the end of the formation of foam are accompanied by a reduction of the foam quality, and in addition the system has little variability with regard to various operating modes, foam types and foam compositions.

It would therefore be desirable to address remaining challenges in this area, such as by providing a device and a method which exhibit greater variability in the production and application of foam material, and at the same time are able to produce equal or even higher foam quality than known systems.

SUMMARY

Generally, a foam producing device is provided and includes a gas supply line, a material supply line, a material transporting device, and a mixing device. In an illustrative embodiment of the invention, a foam transporting device is provided to achieve more variable transport rates of material, foam and gas. This makes it possible to improve the foam quality through better matched transport rates and also enables the foam producing device to be operated in different operating modes in order, for example, to achieve consistent foam quality when the foam production process is interrupted. For example, a device according to the invention might be used to more easily enable a bypass operation, and furthermore may vary the proportion of gas in the foam over a very wide range without negatively affecting the foam quality.

At the same time, the foam transporting device can take a variety of forms and may be designed, for example, as a continuously or intermittently working pump. The foam transporting device may be connected on the input side of the foam producing device to a separate material line and a separate gas line. Alternatively, the gas and the material may be merged prior to or upstream of the input side of the foam transporting device and then fed to the foam transporting device in one common line.

A first embodiment may include the addition of a return line, which is connected on a first end to an output orifice of the foam producing device and on a second end to the input side of the foam transporting device in order to convey foam from the mixing device into the foam transporting device. In one alternative, the return line may extend directly from the output end of the mixing device and lead to the input side of the foam transporting device. But in many cases it is advantageous to connect the return line to a foam application head, which is connected to the output side of the mixing device, and in this way to convey foam from the mixing device through the foam application head via the return line to the input side of the foam transporting device. The return line in this case may either lead directly into the foam transporting device, or into a line which is, for example, already conveying material, gas or both into the foam transporting device.

A gas valve device may be provided to regulate or control the volume of gas flowing through the gas supply line. This makes it possible for the volume of gas supplied per unit of time to be regulated or controlled, in order to be able to influence the foam composition and quality. The gas valve device may be a valve operated with an actuator. The valve may have a flow cross section that can be adjusted from a fully open to a fully closed position.

A throttle device may be positioned downstream of the output end of the foam transporting device in the direction of flow of the foam. Such a throttle device may be provided, for example, in the form of a metering orifice which is inserted into a foam transport line downstream of the mixing device. Such a metering orifice may be adapted to various foam qualities, for example, with regard to its geometric dimensions. Furthermore, the throttle device may take the form of a manually or automatically adjustable valve which restricts the cross section of the foam transport line in a certain adjustable ratio.

A pressure measuring device may also be provided to measure the pressure downstream from the output end of the foam transporting device. The pressure downstream from the output end of the foam transport pump is a suitable measured variable for ascertaining the foam quality, in particular the viscosity of the foam. The procedural parameters of the different parts of the apparatus may be adjusted on the basis of this variable, in order to achieve a particular foam quality.

The pressure measuring device may be designed to determine the pressure before and/or after the throttle device, in particular to determine the differential pressure across the throttle device. The differential pressure across the throttle device, or the pressure before and/or after the throttle device, can be used especially well to determine the foam quality, in particular the viscosity and various characteristics of the foam, and thereby to address the procedural parameters of the other parts of the device.

The pressure measuring device may include a first pressure sensor for determining the pressure before or upstream of the throttle device and a second pressure sensor for determining the pressure after or downstream of the throttle device. This type of design of the pressure measuring device represents an especially robust and cost-effective method for ascertaining the pressure before and after the throttle device. In particular, the differential pressure across the throttle device can be calculated in a simple way from these data.

With the previously described embodiments having a gas valve device and a pressure measuring device, a control device may be provided which is designed to process the signal from the pressure measuring device and to address the gas valve device, in order to adjust a gas flow through the gas supply line and so achieve a certain viscosity of the foam beyond the output side of the foam transporting device. Such a control device makes it possible to reliably set a particular foam quality, in particular a foam viscosity of the foam being produced, and can respond quickly and reliably to external influences such as pressure changes, changes in the quality of the material, in the temperature, the counterpressure or the like.

The device according to the invention is designed to produce foams with various proportions of gas, such as from 0% (=non-foamed material) to 95%. Many applications use a proportion of 60%-95%. The foam transporting device may be designed to transport a greater volume flow than the material transporting device, in particular approximately twice as great a volume flow. It has been found that the volume transport rates of the foam transporting device and the material transporting device have a significant influence on the quality of the foam. It can be advantageous if the foam transporting device transports more volume than the material transporting device, with the ratio of these transport rates being dependent on the type of foam to be produced, the starting material and the starting gas.

A second return line may also be provided and connected at a first end to the output orifice and connectable at a second end to a source of material. The second end can discharge, for example, into an air-filled upper area of the source of material. The second return line may be closed and opened by a controllable valve. The connection with the output orifice may also be provided through an application head. Through this second return line, the material transporting device may be operated in standby mode in a simple manner, and in this mode transports the material from the material source directly back into the material source. This standby mode is advantageous, for example, if the quality of the foam is to be set reliably correct from the beginning, or if this quality is to be maintained during a temporary halt in the demand for foam production. This return line can prevent the material transport from having to be stopped in the forenamed cases. Instead material flow continues so that the quality can be maintained or produced in this way.

Furthermore, the return line enables a flushing process of the system when changing from one foam quality or type to a different foam quality or type. To this end, the delivery of foam is halted and the material transporting device and the mixing device are operated so that transport occurs through the return line directly into the source of material, for example. This circulation is maintained until the system is totally filled with the new foam (for example, a foam with a lesser or greater proportion of gas) and the delivery of foam can be started again.

Furthermore, the return line makes it possible to continue operating the material transporting device during a prolonged halt of the foam output, without producing a critical increase in pressure in the system. This is done by opening the return line when the foam output is closed for a certain period of time, and thus enabling the return of the supplied material.

The material transporting device may be in the form of a gear pump driven by a motor. A gear pump enables a transport rate in proportion to the speed of rotation over a wide range, and can therefore be employed for the necessary control or regulation.

In the forenamed embodiment, a control signal may be produced dependant on the speed of rotation. A control device may be used to process this control signal and to address the gas control device in order to set a flow of gas through the gas supply line and thus to achieve a certain viscosity of the foam downstream from the output side of the foam transporting device. With this embodiment it is possible for the flow of gas to be controlled or regulated dependent on the flow of material, and thereby to achieve high quality foam even as foam output fluctuates.

Another alternative aspect of the invention is a foam application device comprising a foam application head having a foam input orifice and at least one foam application orifice, where the foam input orifice is connected to the output side of a mixing device. This foam application device makes it possible for the advantages of the foam production device according to the invention, as described earlier, to be used advantageously for a foam application process.

At the same time, the foam application device according to the invention may be further refined by a continuous foam flow orifice which is connected to the first end of the previously described return line. The result of this is that the foam application device is operated in a bypass mode in which little or no material is delivered from the foam application orifice, and instead the produced foam application material is fed back to the foam transporting device through the continuous foam flow orifice and thereby circulated. This can allow the material transporting device and the foam transporting device to continue operating when the foam application process has to be interrupted. A uniform foam quality is thereby maintained even when the application process is interrupted. This refinement can also ensure that high quality foam is produced at the beginning of a foam application process. In such a case the foam is first transported through the continuous foam flow orifice in the bypass position until a constant and satisfactory foam quality has appeared, and then the foam application process is started.

A method of the invention may include merging the gas and the material before or in a foam transporting device and transporting these components to the mixing device by way of the foam transporting device. Merging the gas and the material before or in a foam transporting device and in addition transporting this material with the foam transporting device increases the variability of the process, and in addition improves the foam quality in a wide range, or at least keeps it at the same level as in the existing art.

At least part of the foam may be conveyed through a return line from the mixing device into the foam transporting device. This enables a bypass mode in order to keep the foam quality constant before the beginning of production or during production interruptions.

The gas flow may be controlled or regulated by way of a gas valve device. The control or regulation of the gas flow can be employed especially easily with many types of foam to set a certain foam quality, in particular a foam viscosity.

The foam may be restricted after the foam transporting device. This can be used to further stabilize the process, and also to increase the foam quality.

The method according to the invention may be refined further by measuring the foam pressure after the foam transporting device. For example, the differential pressure may be measured across a throttle device behind the foam transporting device. This pressure measurement makes it possible to use the signals thus obtained to control or regulate the method according to the invention. This control or regulation may apply to various procedural steps, and may include for example control or regulation of the material transporting device, the gas valve device or a combination thereof.

The measured (differential) pressure may be sent to a control or regulating device that addresses a gas valve device in such a way that the gas flow is set so that a certain quality, in particular a certain viscosity of the foam is achieved downstream from the output side of the foam transporting device. This enables especially effective and quickly reacting control or regulation of the quality of the foam, in particular its viscosity.

The transported volume flow of foam may be greater than the transported volume flow of material, in particular approximately twice as great. The ratio of the transport rates of foam and material can have a decisive influence on the quality of the foam, and are therefore especially well suited for achieving particular foam qualities.

At least part of the material may be fed back from the output orifice of the mixing device to a source of material, in particular to a level such that the material issues into an air-filled upper area of the source of material. This feedback can preferably also take place through an application head. This achieves a bypass operation of the material transporting device, which enables ongoing operation of the material transporting device even if the demand for foam is interrupted, and consequently achieves especially good foam quality in such cases, and in addition also allows flushing of the system if a change in the foam quality or type is desired.

Finally, the method according to the invention can be refined by having the material transporting device produce a rotational-speed-dependent control signal that is sent to a control device which processes this control signal and uses it to address a gas valve device, in order to set a gas flow through the gas supply line and thus achieve a certain viscosity of the foam downstream from the output side of the foam transporting device. This refinement achieves an especially effective control or regulation of the foam production, which is able to respond to demands for different quantities of foam quickly and with constant foam quality, and can also respond especially well to fluctuation in the external conditions, such as material quality, material temperature, gas pressure and gas temperature.

Another alternative aspect of the method according to the invention is a method for applying a foam to a substrate, with the steps of supplying the foam to a foam application head and delivering the foam onto the substrate from at least one application orifice of the foam application head, where the foam is produced by a method in the manner described earlier.

The foam application method according to the invention can be refined by conveying at least part of the foam from the foam application head to the input side of the foam transporting device. This enables a bypass operation of the foam application device, in which foam material flows through the foam application head, and as a result the foam quality can be kept constant before a foam application begins or when a foam application is interrupted, and the waste of foam can be reduced.

BRIEF DESCRIPTION OF THE DRAWING

The drawing FIGURE shows a schematic representation of the components of an illustrative embodiment of the invention.

DETAILED DESCRIPTION OF THE DRAWING

The device shown includes a material source 10, in which a liquid application material is stored in a heated, molten state.

Material source 10 is connected through a first connecting line 11 to a material transport pump 20, which transports the material from material source 10 into a second connecting line 21.

From the second connecting line 21 the transported material enters a third connecting line segment 22, and is mixed with air from an air supply line 31 at a "T" connection 23.

The volume flow of the air which is fed via the air supply line 31 to the "T" connection 23 is regulated by an air control valve 30, and is connected to the "T" connection 23 with a check valve 32 which prevents material from being pressed from line segment 22 into air return line 31. A regulated throttle valve 33 provides a constant input pressure for air control device 30.

The mixture of air and material is supplied through a fourth connecting line segment 24 to a foam transport pump 40, which transports the volume of air and material on its output side into a fifth connecting line segment 41 that issues into a mixing device 50.

Mixing device 50 is a rotating mixer in which the quantity of air and material is mixed together homogeneously, for example in the manner described in EP 0 220 450 B1, the disclosure of which is hereby fully incorporated by reference herein. In this connection reference is made to EP 0 220 450 B1, in particular to the disk mixer described there according to column 4, line 21 through column 5, line 51, and to FIGS. 2-4 with the corresponding parts of the description.

The homogeneously mixed foam material is fed from the mixer 50 through a sixth line segment 51 to a throttle 60. Pressure sensors 71, 72 of a pressure measuring device 70, which record the pressure differential across throttle 60, are positioned before and after throttle 60 in the direction of foam flow.

Pressure sensors 71, 72 are connected to a control device 73 in order to transmit their pressure measurement signal to that control device. The control device 73 is connected to gas valve device 30, in order to regulate the supply volume flow of the gas through line 31 depending on the pressure measurement signals of pressure sensors 71, 72.

Downstream from throttle 60 the homogeneously mixed foam material is transported through an additional line segment 61 and a flexible hose line 81 to a foam application head 80. Foam application head 80 includes a large number of foam application nozzles 82a, 82b, 82c, from which the foam application material is delivered onto a substrate which runs along under the application orifices of these foam application nozzles.

Foam application head 80 also has a continuous flow orifice 83, which is connected to a flexible hose section 84. Flexible hose section 84 leads into a check valve 85, which is connected to a line segment 86. Between line segments 21 and 22, line segment 86 leads into the transport line between material transport pump 20 and "T" connection 23, at which air is fed in. The foam can be circulated through hose line 84 and line segment 86 by operating foam transport pump 40, without foam being expelled from foam application nozzles 82a, 82b, 82c.

In addition, check valve 85 has a flexible hose line 12, which is connected to hose section 84 and leads through a valve 13 into the upper, air-filled part of material source 10. Through this hose line 12 the material can be circulated through the entire system when material transport pump 20 is operated, without reaching a critical pressure increase in the system when no foam is expelled from foam application nozzles 82a, 82b, 82c. To this end, valve 13 is opened when the delivery of foam is to be stopped for a certain length of time.

In addition, the entire system can be flushed by means of hose line 12, by closing the foam application nozzles, opening valve 13, and allowing circulation to occur until for example the entire system is filled with a new changed quality of foam.

Material transport pump 20 transports material from material source 10 to foam transport pump 40. In a first possible operating mode no air is supplied to this material, so that the material is fed through mixing device 50 to application head 80 without being mixed with air, and consequently an application of unfoamed material from the material source is achieved. Here the material can be circulated through flexible lines 84, 12 in a bypass operation, if material transport pump 20 and foam transport pump 40 are operated. Alternatively, in a second operating mode the material can be circulated in a small circuit through flexible line 84 and line segment 86, if only foam transport pump 40 is operated.

In a third operating mode, air or some other gas, such as nitrogen, is fed to the transported material at "T" connection 23, so that a mass of gas and material enters foam transport pump 40 and is transported from there into mixing device 50. A pre-mixing of the material and the gas takes place in the foam transport pump. This mixture of gas and material is mixed to a homogeneous foam in mixing device 50, and finally is fed to application head 80. At application head 80 this foam material is delivered onto a substrate from application nozzles 82a, 82b, 82c.

If the application process is to be interrupted temporarily, application nozzles 82a, 82b, 82c can be closed and the foam material circulated through flexible line 84 while foam transport pump 40 is operating. During this process the material transport pump can either be shut off, or the material transport pump can also be operated in bypass mode, with the foam being returned to material source 10 through flexible lines 84, 12.

The foam production and application process here is regulated by having pressure sensors 71, 72 detect the pressure differential across the throttle 60 and send it to the control device 73. The control device 73 compares the measured pressure differential to a predetermined target pressure differential for the desired foam quality, and feeds a signal to gas valve device 30 that depends on the difference between the actual and the target pressure differential, in order to increase or decrease the supply of gas, or else activates the foam transport pump and/or the mixing device accordingly.

An additional controlling or regulating effect is achieved through the fact that material transport pump 20 is in the form of a gear pump, and produces a signal dependent on the speed of rotation, which is also sent to the control device. On the basis of this speed-based signal, the control device 73 now addresses gas valve device 30 in such a way that when the speed of rotation of the material transport pump 20 rises an increasing volume of gas is also fed in at the "T" connection 23, and vice versa.

While the present invention has been illustrated by a description of various illustrative embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or any combinations depending on the needs and preferences of the user. However, the invention itself should only be defined by the appended claims.

What is claimed is:

1. A method for producing a foam material, comprising:
   feeding a gas from a source of gas;
   feeding a material from a source of material;
   transporting the material by means of a material feeder device;
   bringing the gas and the material together at a location while preventing flow of the material toward the source of gas at that location;
   transporting the gas and the material to a mixer by means of a foam feeder device;
   mixing the gas and the material in the mixer; and
   dispensing a foam from a discharge opening in the mixer.

2. The method according to claim 1, further comprising directing the foam at least partially through a recirculation line out of the mixer into the foam feeder device.

3. The method according to claim 1, further comprising controlling a flow of the gas by means of a gas flow control valve.

4. The method according to claim 1, further comprising measuring a pressure difference across a flow restriction device downstream of the foam feeder device.

5. The method according to claim 4, wherein the flow restriction device is a throttle.

6. The method according to claim 4, further comprising measuring the pressure upstream and downstream of the flow restriction device with respective first and second pressure sensors.

7. The method according to claim 4, further comprising supplying the measured pressure difference to a controller which controls a gas flow control valve and adjusting a gas flow to achieve a particular quality of the foam downstream of the foam feeder device.

8. The method according to claim 7, further comprising adjusting the gas flow to achieve a specific viscosity of the foam downstream of the foam feeder device.

9. The method according to claim 1, further comprising supplying the foam with a volumetric flow rate greater than a volumetric flow rate of the material.

10. The method according to claim 9, further comprising supplying the foam with a volumetric flow rate that is about twice that of the volumetric flow rate of the material.

11. The method according to claim 1, further comprising:
    feeding the foam to a foam dispenser head; and
    dispensing the foam onto a substrate from at least one dispenser opening of the foam dispenser head.

12. The method according to claim 11, further comprising directing the foam at least partially from the foam dispenser head to the foam feeder device.

13. The method according to claim 1, further comprising transporting the material through a motor-driven gear pump.

14. The method according to claim 1, further comprising directing the foam from the discharge opening of the mixer into the foam feeder device.

15. The method of claim 1, wherein preventing flow of material includes preventing the flow of material with a check valve.

16. A method for producing a foam material, comprising:
feeding a gas from a source of gas;
feeding a material from a source of material;
transporting the material by means of a material feeder device;
mixing the gas and the material in a mixer;
dispensing a foam from a discharge opening in the mixer;
bringing the gas and the material together upstream from or inside a foam feeder device;
transporting the gas and the material to the mixer by means of the foam feeder device; and
restricting the flow of foam downstream of the foam feeder device.

17. A method for producing a foam material, comprising:
feeding a gas from a source of gas;
feeding a material from a source of material;
transporting the material by means of a material feeder device;
mixing the gas and the material in a mixer;
dispensing a foam from a discharge opening in the mixer;
bringing the gas and the material together upstream from or inside a foam feeder device;
transporting the gas and the material to the mixer by means of the foam feeder device; and
recirculating the material at least partially from the discharge opening of the mixer to the source of material such that the material flows into an air-filled upper zone of the source of material.

18. A method for producing a foam material, comprising:
feeding a gas from a source of gas;
feeding a material from a source of material;
transporting the material by means of a material feeder device;
mixing the gas and the material in a mixer;
dispensing a foam from a discharge opening in the mixer;
bringing the gas and the material together upstream from or inside a foam feeder device;
transporting the gas and the material to the mixer by means of the foam feeder device; and
generating a speed-dependent control signal, supplying the speed-dependent control signal from the material feeder device, processing the control signal at a controller, and using the control signal to control a gas flow control valve in order to set a specific gas flow rate through a gas feed line to thereby achieve a specific viscosity of the foam downstream of the foam feeder device.

* * * * *

UNITED STATES PATENT AND TRADEMARK OFFICE
CERTIFICATE OF CORRECTION

PATENT NO. : 7,597,931 B2  Page 1 of 1
APPLICATION NO. : 11/470081
DATED : October 6, 2009
INVENTOR(S) : Jones et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 306 days.

Signed and Sealed this

Twenty-eighth Day of September, 2010

David J. Kappos
*Director of the United States Patent and Trademark Office*